United States Patent
Gurel et al.

(10) Patent No.: US 11,818,124 B2
(45) Date of Patent: Nov. 14, 2023

(54) ATTESTATION OF A PLATFORM ENTITY

(71) Applicant: Telefonaktiebolaget LM Ericsson (publ), Stockholm (SE)

(72) Inventors: Ilhan Gurel, Espoo (FI); Kazi Wali Ullah, Espoo (FI); Ari Pietkäinen, Espoo (FI)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 281 days.

(21) Appl. No.: 17/415,201

(22) PCT Filed: Dec. 18, 2018

(86) PCT No.: PCT/EP2018/085382
§ 371 (c)(1),
(2) Date: Jun. 17, 2021

(87) PCT Pub. No.: WO2020/125942
PCT Pub. Date: Jun. 25, 2020

(65) Prior Publication Data
US 2022/0078186 A1    Mar. 10, 2022

(51) Int. Cl.
*H04L 9/40* (2022.01)
*H04L 9/08* (2006.01)
*H04L 9/32* (2006.01)
*G06F 21/57* (2013.01)
*G06F 21/44* (2013.01)
*G06F 9/4401* (2018.01)

(52) U.S. Cl.
CPC ........ *H04L 63/0869* (2013.01); *G06F 21/445* (2013.01); *G06F 21/57* (2013.01);
(Continued)

(58) Field of Classification Search
CPC ..... H04L 63/08; H04L 63/0869; H04L 63/04; H04L 63/0428; H04L 63/06;
(Continued)

(56) References Cited

U.S. PATENT DOCUMENTS 8,613,387 B1* 12/2013 Billett .................... G06F 21/57
235/379
2014/0281574 A1* 9/2014 Webb .................... H04L 9/0863
713/189
(Continued)

FOREIGN PATENT DOCUMENTS

WO    2011015007 A1    2/2011

OTHER PUBLICATIONS

International Search Report and Written Opinion dated Jul. 25, 2019 for International Application No. PCT/EP2018/085382 filed Dec. 18, 2018, consisting of 12-pages.
(Continued)

*Primary Examiner* — Shaqueal D Wade-Wright
(74) *Attorney, Agent, or Firm* — Christopher & Weisberg, P. A.

(57) ABSTRACT

A mechanism and method are provided for attesting a platform entity. The method is performed by a verification entity. The method may include performing mutual authentication between a TEE of the verification entity and a TEE of the platform entity. The method may include sending, towards the TEE of the platform entity, a first piece of protected secret data. The method may include sending, towards the TEE of the platform entity, at least one protected nonce. The method may include receiving, from the TEE of the platform entity, a protected concatenation of the secret data and the at least one nonce. The method may include attesting the platform entity by, in the TEE of the verification entity, verifying that the secret data and the at least one nonce received from the platform entity are identical to the sent secret data and at least one nonce.

17 Claims, 6 Drawing Sheets

(52) U.S. Cl.
CPC .......... *H04L 9/0819* (2013.01); *H04L 9/0861* (2013.01); *H04L 9/3242* (2013.01); *H04L 9/3273* (2013.01); *G06F 9/4401* (2013.01)

(58) Field of Classification Search
CPC ....... H04L 63/061; H04L 63/068; H04L 9/32; H04L 9/3273; H04L 9/3243; H04L 9/08; H04L 9/0819; H04L 9/0861; H04L 9/0833; G06F 21/44; G06F 21/445; G06F 21/57; G06F 9/4401; H04W 12/04; H04W 12/0471
See application file for complete search history.

(56) References Cited

U.S. PATENT DOCUMENTS

| | | | |
|---|---|---|---|
| 2015/0264021 A1* | 9/2015 | Schulz | ................ H04L 63/0414 713/170 |
| 2016/0350534 A1 | 12/2016 | Poornachandran et al. | |
| 2018/0019880 A1 | 1/2018 | Wu et al. | |
| 2018/0234255 A1* | 8/2018 | Fu | ............................. H04L 9/30 |

OTHER PUBLICATIONS

ETSI GR NFV-SEC 007 V1.1.1; Network Functions Virtualisation (NFV); Trust; Report on Attestation Technologies and Practices for Secure Deployments, Oct. 2017, consisting of 32-pages.

ETSI GR NFV-SEC 018 V1.1.1; Network Functions Virtualisation (NFV); Security; Report on NFV Attestation Architecture, Nov. 2019, consisting of 33-pages.

Johannes Gotzfried; Trusted Systems in Untrusted Environments: Protecting Against Strong Attackers; The technical faculty of Friedrich Alexander University Erlangen-Nuremberg; Dec. 7, 2017, consisting of 133-pages.

Indian Office Action dated Mar. 11, 2022 for Patent Application No. 202117028377 filed Jun. 24, 2021, consisting of 6-pages.

* cited by examiner

ATTESTATION OF A PLATFORM ENTITY

CROSS-REFERENCE TO RELATED APPLICATIONS

This application is a Submission Under 35 U.S.C. § 371 for U.S. National Stage Patent Application of International Application Number: PCT/EP2018/085382, filed Dec. 18, 2018 entitled "ATTESTATION OF A PLATFORM ENTITY," the entirety of which is incorporated herein by reference.

TECHNICAL FIELD

Embodiments presented herein relate to a method, a verification entity, a computer program, and a computer program product for attesting a platform entity.

Embodiments presented herein further relate to a method, a platform entity, a computer program, and a computer program product for enabling attestation of the platform entity by the verification entity.

BACKGROUND

In general terms, a platform entity can be regarded as a collection of hardware and software resources where an application can be run. Even though the application may have very strong security functionality, if the platform entity is compromised in terms of security, then there is a possibility that data and software code of the application are at risk. Platform integrity verification can be used to verify the integrity of the platform entity.

Successful platform integrity verification of the platform entity guarantees a user of the platform entity that the platform entity is in a trustworthy state where no unauthorized hardware or software modification has occurred.

Typically, the integrity of the platform entity can be verified by a remote attestation mechanism performed during bootstrapping of the platform entity. One goal of the remote attestation is to enable a remote system, representing a verifier entity, to determine the level of trust in the integrity of the platform entity. The architecture for remote attestation commonly has two major components; an integrity measurement architecture and a remote attestation protocol. A typical remote attestation comprises an attestation request from the verifier entity. In response to the attestation request the platform entity provides necessary signed measurement data to the verifier entity. The verifier entity then verifies those data against golden measurements and validates the signature.

However, to execute the remote attestation protocol during runtime of the platform entity poses challenges for the measurement of the software. As during runtime certain parts of the software code might be changed, the remote attestations process has to know beforehand which part, or parts, of the software code that will not change, or the remote attestations process has to predict what changes will take place and perform the attestation based on that prediction. This is not trivial and also makes the attestation process complex and dependent on the software code structure.

Hence, there is still a need for improved mechanisms for attesting a platform entity

SUMMARY

An object of embodiments herein is to provide efficient attestation of a platform entity that does not suffer from the issues noted above, or at least where these issues are mitigated or reduced.

According to a first aspect there is presented a method for attesting a platform entity. The method is performed by a verification entity. The method comprises performing mutual authentication between a trusted execution environment (TEE) of the verification entity and a TEE of the platform entity. The method comprises sending, towards the TEE of the platform entity, a first piece of protected secret data. The method comprises sending, towards the TEE of the platform entity, at least one protected nonce. The method comprises receiving, from the TEE of the platform entity, a protected concatenation of the secret data and the at least one nonce. The method comprises attesting the platform entity by, in the TEE of the verification entity, verifying that the secret data and the at least one nonce received from the platform entity are identical to the sent secret data and at least one nonce.

According to a second aspect there is presented a verification entity for attesting a platform entity. The verification entity comprises processing circuitry. The processing circuitry is configured to cause the verification entity to perform mutual authentication between a TEE of the verification entity and a TEE of the platform entity. The processing circuitry is configured to cause the verification entity to send, towards the TEE of the platform entity, a first piece of protected secret data. The processing circuitry is configured to cause the verification entity to send, towards the TEE of the platform entity, at least one protected nonce. The processing circuitry is configured to cause the verification entity to receive, from the TEE of the platform entity, a protected concatenation of the secret data and the at least one nonce. The processing circuitry is configured to cause the verification entity to attest the platform entity by, in the TEE of the verification entity, verifying that the secret data and the at least one nonce received from the platform entity are identical to the sent secret data and at least one nonce.

According to a third aspect there is presented a verification entity for attesting a platform entity. The verification entity comprises an authentication module configured to perform mutual authentication between a TEE of the verification entity and a TEE of the platform entity. The verification entity comprises a send module configured to send, towards the TEE of the platform entity, a first piece of protected secret data. The verification entity comprises a send module configured to send, towards the TEE of the platform entity, at least one protected nonce. The verification entity comprises a receive module (210e) configured to receive, from the TEE of the platform entity, a protected concatenation of the secret data and the at least one nonce. The verification entity comprises an attest module configured to attest the platform entity by, in the TEE of the verification entity, verifying that the secret data and the at least one nonce received from the platform entity are identical to the sent secret data and at least one nonce.

According to a fourth aspect there is presented a computer program for attesting a platform entity. The computer program comprises computer program code which, when run on processing circuitry of a verification entity, causes the verification entity to perform a method according to the first aspect.

According to a fifth aspect there is presented a method for enabling attestation of a platform entity by a verification entity. The method is performed by the platform entity. The method comprises performing mutual authentication between a TEE of the platform entity and a TEE of the verification entity. The method comprises receiving, from the TEE of the verification entity, a first piece of protected secret data. The method comprises receiving, from the TEE of the verification entity, at least one protected nonce. The method comprises sending, towards the TEE of the verification entity, a protected concatenation of the secret data and the at least one nonce, the secret data and the at least one nonce having been concatenated and protected in the TEE of the platform entity.

According to a sixth aspect there is presented a platform entity for enabling attestation of the platform entity by a verification entity. The platform entity comprises processing circuitry. The processing circuitry is configured to cause the platform entity to perform mutual authentication between a TEE of the platform entity and a TEE of the verification entity. The processing circuitry is configured to cause the platform entity to receive, from the TEE of the verification entity, a first piece of protected secret data. The processing circuitry is configured to cause the platform entity to receive, from the TEE of the verification entity, at least one protected nonce. The processing circuitry is configured to cause the platform entity to send, towards the TEE of the verification entity, a protected concatenation of the secret data and the at least one nonce, the secret data and the at least one nonce having been concatenated and protected in the TEE of the platform entity.

According to a seventh aspect there is presented a platform entity for enabling attestation of the platform entity by a verification entity. The platform entity comprises an authentication module configured to perform mutual authentication between a TEE of the platform entity and a TEE of the verification entity. The platform entity comprises a receive module configured to receive, from the TEE of the verification entity, a first piece of protected secret data. The platform entity comprises a receive module configured to receive, from the TEE of the verification entity, at least one protected nonce. The platform entity comprises a send module configured to send, towards the TEE of the verification entity, a protected concatenation of the secret data and the at least one nonce, the secret data and the at least one nonce having been concatenated and protected in the TEE of the platform entity.

According to an eight aspect there is presented a computer program for enabling attestation of a platform entity by a verification entity, the computer program comprising computer program code which, when run on processing circuitry of the platform entity, causes the platform entity to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these verification entities, these platform entities, these computer programs, and this computer program product provide efficient attestation of the platform entity. For example, the attestation is efficient in number of central processing unit cycles needed for the methods to be carried out. For example, the attestation requires less central processing unit cycles than traditional remote attestation mechanisms Advantageously these methods, these verification entities, these platform entities, these computer programs, and this computer program product do not suffer from the issues noted above.

Advantageously these methods, these verification entities, these platform entities, these computer programs, and this computer program product are scalable for virtualization platform entities.

Advantageously these methods, these verification entities, these platform entities, these computer programs, and this computer program product are not dependent on trusted third party attestation services.

Advantageously the attestation of runtime platform integrity verification is made simple since remote attestation mechanisms (such as based on backend or third party services) are not needed. Advantageously the attestation does not require a chain of trust to be maintained. Advantageously golden measurements of all the software components do not need to be managed.

Advantageously the attestation is transparent to legitimate software and firmware updates of the platform entity.

Advantageously the attestation is affordable to be carried out frequently, since performance impacts on actual application functionality of the platform entity are negligible.

Advantageously, since multiple instance of the attestation can be performed at random points in time during runtime of the platform entity, the attestation makes possible attacks more costly as compared to attestation with regular rules at specific system states.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
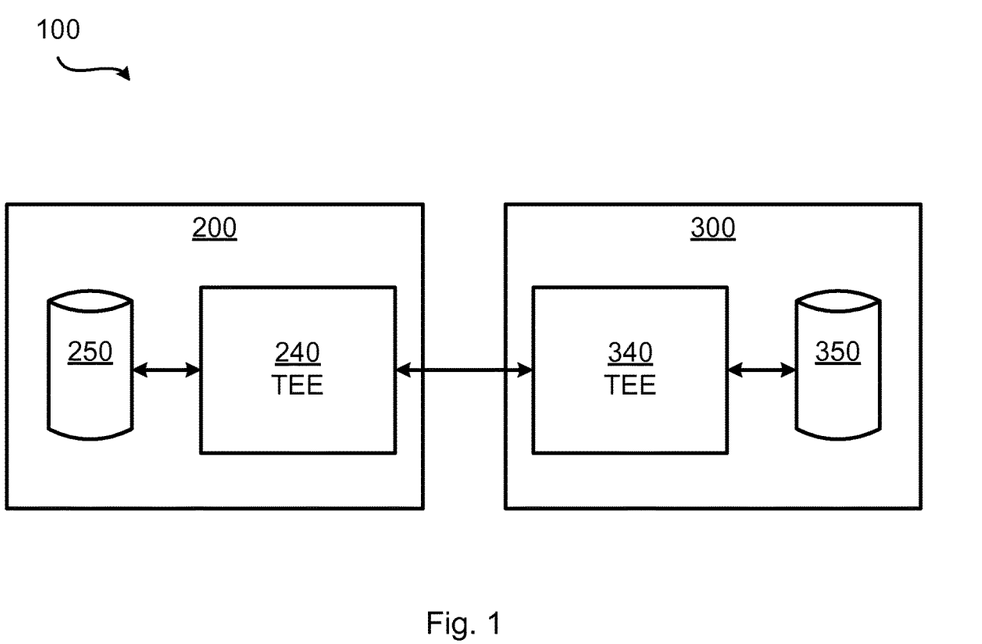
FIG. 1 is a schematic diagram illustrating a communication network according to embodiments.

FIG. 1 is a schematic diagram illustrating a communication network 100 where embodiments presented herein can be applied. The communication network 100 comprises a verification entity 200 and a platform entity 300. The platform entity 300 comprises hardware and software resources where an application can be run. The verification entity 200 is configured to attest the platform entity 300. The platform entity 300 is thus configured to be attested by the verification entity 200. The verification entity 200 comprises a trusted computing element in the form of a TEE 240 and an internal storage 250. The TEE 240 of verification entity 200 could be an enclave instance. The platform entity 300 also comprises a trusted computing element in the form of a TEE 340 and an internal storage 350. The TEE 340 of platform entity 200 could be an enclave instance.

In some aspects the platform entity 300 is part of network equipment such as a core network node, radio access network node, radio base station, base transceiver station, node B (NB), evolved node B (eNB), gNB, access point, access node, portable wireless device, mobile station, mobile phone, handset, wireless local loop phone, user equipment (UE), smartphone, laptop computer, tablet computer, wireless modem, network equipped vehicle, or wireless sensor device. In other aspects the platform entity 300 is part of a type of computation equipment.

The embodiments disclosed herein thus relate to mechanisms for attesting a platform entity 300 and enabling attestation of the platform entity 300 by a verification entity 200. In order to obtain such mechanisms there is provided a verification entity 200, a method performed by the verification entity 200, a computer program product comprising code, for example in the form of a computer program, that when run on processing circuitry of the verification entity 200, causes the verification entity 200 to perform the method. In order to obtain such mechanisms there is further provided a platform entity 300, a method performed by the platform entity 300, and a computer program product comprising code, for example in the form of a computer program, that when run on processing circuitry of the platform entity 300, causes the platform entity 300 to perform the method.

Figure 2:
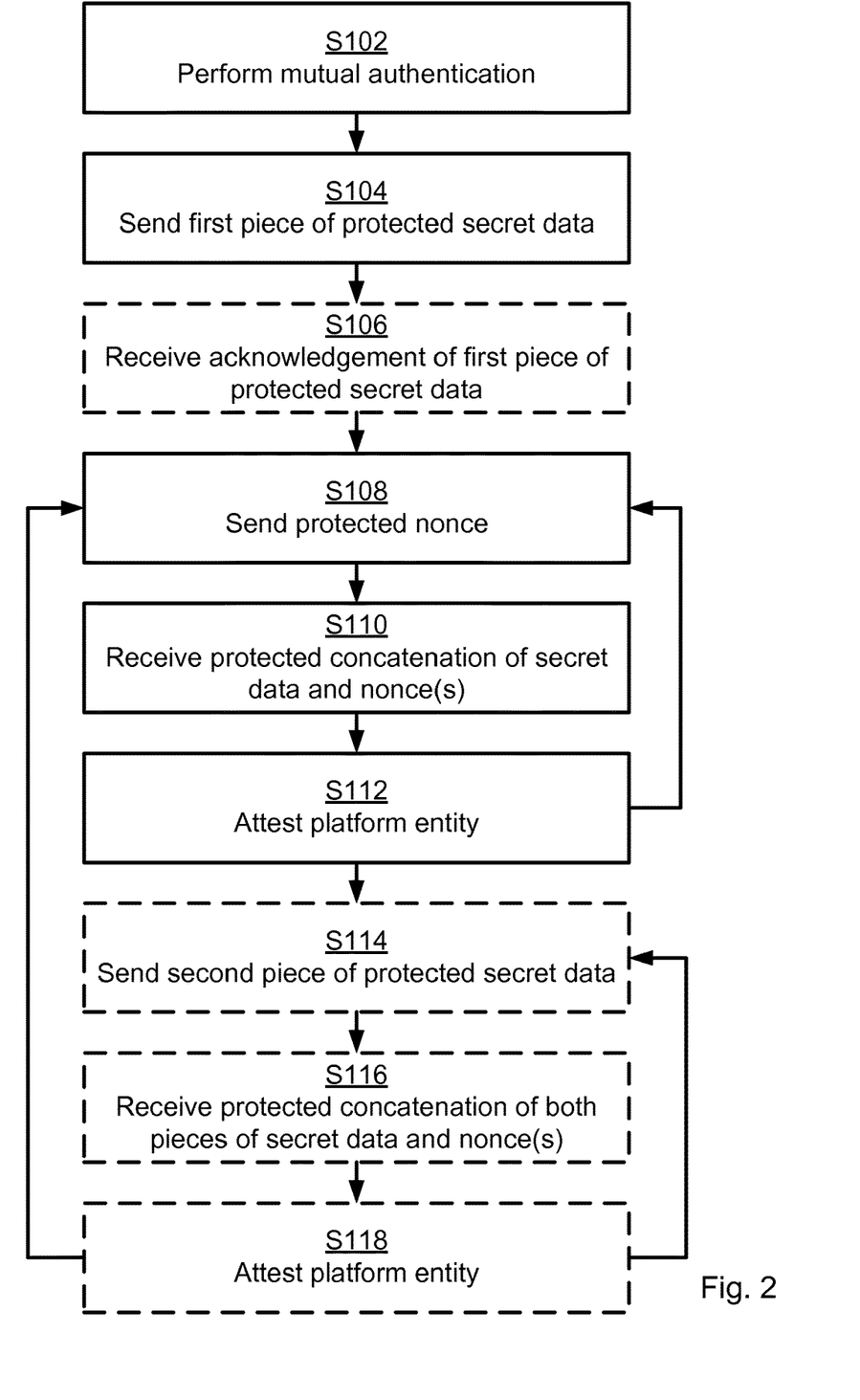
FIGS. 2 and 3 are flowcharts of methods according to embodiments.

Reference is now made to FIG. 2 illustrating a method for attesting a platform entity 300 as performed by the verification entity 200 according to an embodiment.

The verification entity 200 and the platform entity 300 establish an initial trust. The verification entity 200 is therefore configured to perform step S102:

S102: The verification entity 200 performs mutual authentication between the TEE 240 of the verification entity 200 and the TEE 340 of the platform entity 300.

As will be further disclosed below, the attestation of the platform entity 300 is based on data and nonce(s) sent from the verification entity 200 to the platform entity 300. The verification entity 200 is therefore configured to perform steps S104 and S108.

S104: The verification entity 200 sends, towards the TEE 340 of the platform entity 300, a first piece of protected secret data.

S108: The verification entity 200 sends, towards the TEE 340 of the platform entity 300, at least one protected nonce.

In some aspects, the first piece of protected secret data acts as an initial source of assurance for the platform entity 300. The verification entity 200 might provide a nonce to the platform entity 300 at any time. A plurality of protected nonces might thus be sent towards the TEE 340 of the platform entity 300 at different points in time. The verification entity 200 might thus send any arbitrary number of nonces towards the platform entity 300 by repetition of step S108.

The verification entity 200 might, by sending the data and nonce(s), implicitly request the platform entity 300 to return a concatenation of the data and the recent-most sent nonce. It is assumed that, only when the platform entity 300 is in a trustworthy state it is enabled to concatenate the thus received secret data and the at least one nonce and send a protected concatenation of the secret data and the recent-most nonce towards the verification entity 200. Hence, the verification entity 200 is configured to perform step S110:

S110: The verification entity 200 receives, from the TEE 340 of the platform entity 300, a protected concatenation of the secret data and the at least one nonce.

Upon receiving the secret data and the at least one nonce, the verification entity 200 verifies whether the platform entity 300 is in a trustworthy state. In particular, the verification entity 200 is configured to perform step S112:

S112: The verification entity 200 attests the platform entity 300 by, in the TEE 240 of the verification entity 200, verifying that the secret data and the at least one nonce received from the platform entity 300 are identical to the sent secret data and at least one nonce.

In this respect, as noted above, the verification entity 200 might send a plurality of nonces and the platform entity 300 at each time returns a concatenation of the data and the recent-most sent nonce. Thus, the expression the at least one nonce refers to the recent-most sent nonce. That is, as an example, if N nonces are sent by the verification entity 200 after having sent the first piece of protected secret data, then the platform entity will send N responses to the verification entity 200 and the verification entity 200 will perform N attestations of the platform entity 300. For attestation of nonce n, where $0<n\leq N$, the platform entity 300 will send a concatenation of the first piece of protected secret data and nonce n, and the verification entity 200 will verify that the secret data and nonce n as received from the platform entity 300 are identical to the sent secret data and nonce n. That is, the verifier entity will send nonce 1, receive a concatenation of the secret data and nonce 1, attest the platform entity 300 based on the secret data and nonce 1, send nonce 2, receive a concatenation of the secret data and nonce 2, attest the platform entity 300 based on the secret data and nonce 2, and so on for the N nonces.

If the secret data and the at least one nonce received from the platform entity 300 are identical to the sent secret data and at least one nonce then the platform entity 300 is considered to be in a trustworthy state and is thus successfully attested. If the secret data and the at least one nonce received from the platform entity 300 are not identical to the sent secret data and at least one nonce then the platform entity 300 is considered to not be in a trustworthy state and thus attestation of the platform entity 300 fails.

Embodiments relating to further details of attesting a platform entity 300 as performed by the verification entity 200 will now be disclosed.

There might be different points in time when the mutual authentication is performed. According to an embodiment, the mutual authentication is performed as part of a bootstrapping process of the platform entity 300. Sharing the first piece of protected secret data might be a part of the initial bootstrapping process of the platform entity 300.

There may be different ways to perform the mutual authentication in step S102. In some aspects the mutual authentication further involves the generation and exchange of public keys, and the derivation of symmetric keys. Particularly, according to an embodiment, the verification entity 200 as part of performing the mutual authentication, generates and exchanges a key with the platform entity 300 for protecting the secret data and the at least one nonce when sent towards the TEE 340 of the platform entity 300. The key might be sealed at the TEE 240 of the verification entity 200.

In some aspects the bootstrapping process of the platform entity 300 also comprises the following.

Both the verification entity 200 and the platform entity 300 generate an ephemeral key pair for key exchange with each other. The ephemeral key pair can be generated using any public key crypto based key exchange algorithm which may or may not be post quantum resistant. The ephemeral key pairs are generated at the time of first contact or secure bootstrapping of the platform entity 300. Respective private keys are protected securely on both sides. The ephemeral key pairs are exchanged according to the principle of trust on first use (TOFU).

As a result of the key exchange, both the verification entity 200 and the platform entity 300 derive a symmetric key "sk", which is used for encrypting pieces of protected secret data as well when determining a MAC of attestation messages. The symmetric key "sk" is protected securely both the verification entity 200 and the platform entity 300. This can be achieved by sealing the "sk" in a secure hardware element e.g. TEE, TPM, HSM or other sealing the symmetric key "sk" into a virtualized security service binding to the respective TEEs 240, 340.

The first piece of protected secret data can thus be sent towards the platform entity 300 upon being encrypted using an authenticated encryption with associated data (AEAD) scheme based on the symmetric key "sk" at the verification entity 200.

In some aspects, during the bootstrapping process, the verifier entity 200 completely trusts the platform entity 300 and assumes that data is sealed securely and cannot be leaked to attackers. The trust could be due to a known relationship between the verifier entity 200 and the platform entity 300. In the case of network functions virtualization (NFV), the operator can take the role of the verifier entity 200 and the NFV Infrastructure (NFVI) provider can take the role the platform entity 300. Since, in a usual case a strict relationship exists between and operator and its NFVI provider, the initial trust setup process can be established as well out of band.

In some aspects the platform entity 300 acknowledges safe receipt of the data. Hence, according to an embodiment the verification entity 200 is configured to perform (optional) step S106:

S106: The verification entity 200 receives, from the TEE 340 of the platform entity 300, acknowledgement of receipt of the first piece of protected secret data. The at least one protected nonce is (as in step S108) then sent after reception of the acknowledgement.

The trust level might be increased by more data being sent to the platform entity 300 (assuming that the data is returned from the platform entity 300). According to an embodiment the verification entity 200 is therefore configured to perform (optional) steps S114, S116, S118:

S114: The verification entity 200 sends, towards the TEE 340 of the platform entity 300, a second piece of protected secret data.

S116: The verification entity 200 receives, from the TEE 340 of the platform entity 300, a protected concatenation of both pieces of secret data and the at least one nonce.

S118: The verification entity 200 attests the platform entity 300 by, in the TEE 240 of the verification entity 200, verifying that both pieces of secret data and the at least one nonce received from the platform entity 300 are identical to the sent both pieces of secret data and at least one nonce.

The second piece of protected secret data might be sent at any time after step S104 but preferably after step S112. According to an embodiment, when in time to send the second piece of protected data is randomly selected. The verification entity 200 might thus send any arbitrary number of pieces of protected data towards the platform entity 300 by repetition of steps S114-S118.

There could be different types of secret data. According to an embodiment, the secret data is random-valued. This applies for both the first piece of protected secret data and the second piece of protected secret data.

As disclosed above, the at least one nonce might be sent at any time. According to an embodiment, when in time to send each of the at least one nonce is randomly selected. By randomly selecting when to send a nonce the trust level might be increased since it might be difficult for an attacker to predict when in time each nonce is sent. Further, according to an embodiment, each of the at least one nonce is sent during runtime of the platform entity 300.

According to an embodiment, the first piece of data is concatenated with an identifier of the first piece of data before being protected and sent to the platform entity 300. The at least one nonce is then concatenated with this identifier before being protected and sent to the platform entity 300. Hence, if also a second piece of protected data is sent, the second piece of data might be concatenated with an identifier of the second piece of data before being protected and sent to the platform entity 300, and the at least one nonce might then be concatenated with this identifier before being protected and sent to the platform entity 300.

The trust level might be increased by using message authentication codes (MACs). In particular, according to an embodiment, the first piece of protected secret data is accompanied by a message authentication code of the first piece of protected secret data.

The trust level might be increased by using digests. In particular, according to an embodiment, the concatenation of the secret data and the at least one nonce is provided as a digest of the concatenation of the secret data and the at least one nonce.

Figure 3:
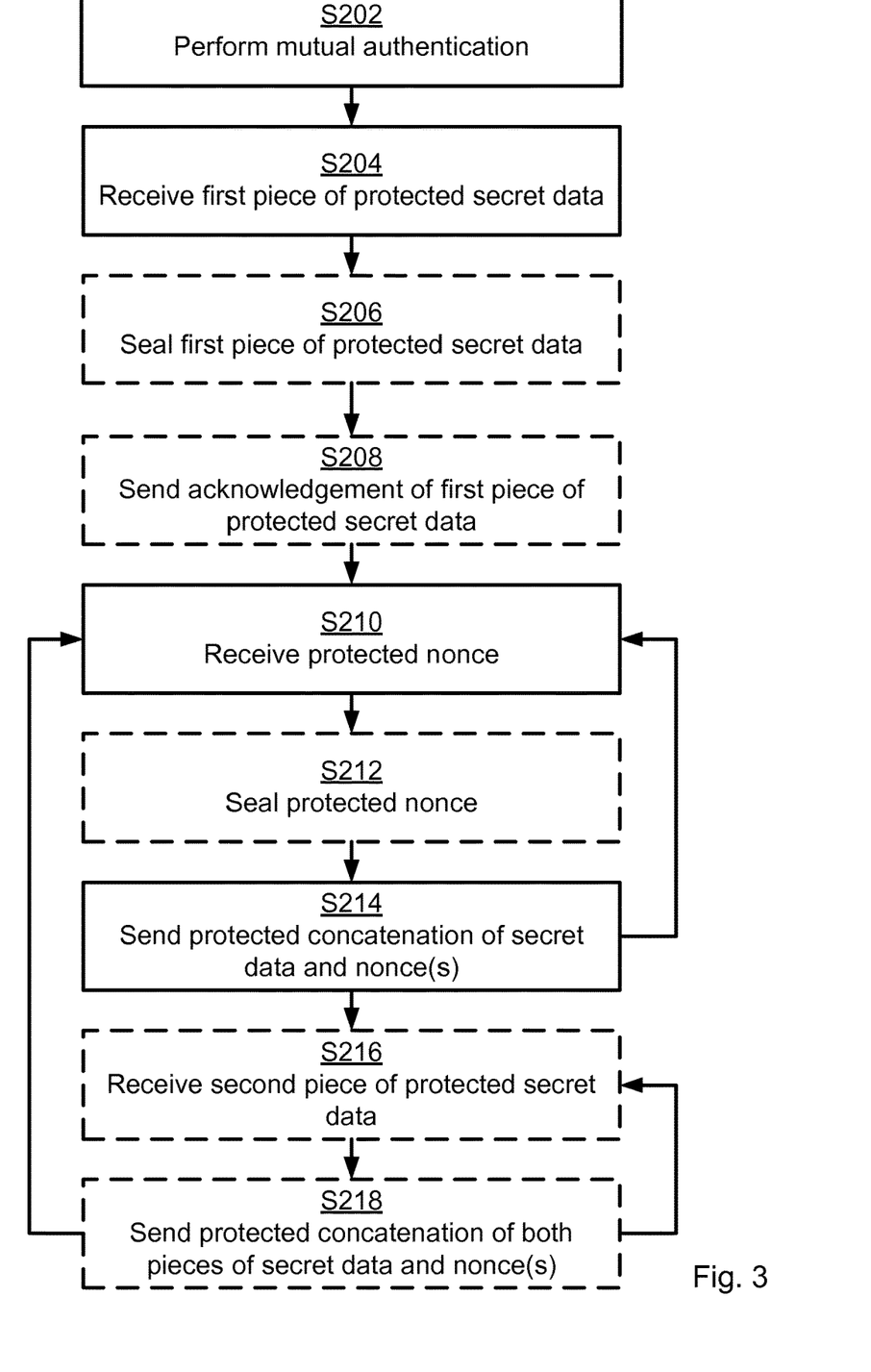

Reference is now made to FIG. 3 illustrating a method for enabling attestation of the platform entity 300 by the verification entity 200 as performed by the platform entity 300 according to an embodiment.

In accordance with above step S102, the platform entity 300 and the verification entity 200 establish an initial trust. The platform entity 300 is therefore configured to perform step S202:

S202: The platform entity 300 performs mutual authentication between the TEE 340 of the platform entity 300 and the TEE 240 of the verification entity 200.

As disclosed above, the verification entity 200 in steps S104 and S108 sends data and nonce(s) to the platform entity 300. It is assumed that the platform entity 300 receives the data and nonce(s) and thus is configured to perform steps S204 and S210:

S204: The platform entity 300 receives, from the TEE 240 of the verification entity 200, a first piece of protected secret data.

S210: The platform entity 300 receives, from the TEE 240 of the verification entity 200, at least one protected nonce.

As disclosed above, the verification entity 200 might provide a nonce to the platform entity 300 at any time. A plurality of protected nonces might thus be received from the TEE 240 of the verification entity 200 at different points in time.

As disclosed above, the verification entity 200 might, by sending the data and nonce(s), implicitly request the platform entity 300 to return a concatenation of the data and the recent-most sent nonce. The platform entity 300 is therefore configured to perform step S214:

S214: The platform entity 300 sends, towards the TEE 240 of the verification entity 200, a protected concatenation of the secret data and the at least one nonce. The secret data and the at least one nonce have been concatenated and protected in the TEE 340 of the platform entity 300.

Only when the platform entity 300 is in a trusted state, it is enabled to obtain the concatenated and protected secret data and the at least one nonce from the TEE 340 of the platform entity 300. Otherwise the TEE 340 will refuse to output the concatenated and protected secret data and the at least one nonce and the platform entity 300 would therefore not be able to send the protected concatenation of the secret data and the at least one nonce to the verification entity 200.

Embodiments relating to further details of enabling attestation of the platform entity 300 by the verification entity 200 as performed by the platform entity 300 will now be disclosed.

In accordance with the above, the mutual authentication might be performed as part of a bootstrapping process of the platform entity 300.

In accordance with the above, there may be different ways to perform the mutual authentication in step S202. According to an embodiment, the platform entity 300 as part of performing the mutual authentication, generates and exchanges a key with the verification entity 200 for protecting the concatenation of the secret data and the at least one nonce when sent towards the TEE 240 of the verification entity 200. The key might be sealed at the TEE 340 of the platform entity 300.

In accordance with the above, each of the at least one nonce might be sent during runtime of the platform entity 300. Hence, according to an embodiment each of the at least one nonce is received during runtime of the platform entity 300.

In accordance with the above, in some aspects the platform entity 300 acknowledges safe receipt of the data. Hence, according to an embodiment the platform entity 300 is configured to perform (optional) step S208:

S208: The platform entity 300 sends, towards the TEE 240 of the verification entity 200, acknowledgement of receipt of the first piece of protected secret data.

The at least one protected nonce is (as in step S210) then receive after the acknowledgement has been sent.

In general terms, the protected secret data and at least one nonce should be handled with care by the platform entity 300 in order to maintain security and prevent the protected secret data and at least one nonce to be leaked to an attacker. In some aspects the first piece of protected secret data is sealed. Thus, according to an embodiment the platform entity 300 is configured to perform (optional) step S206:

S206: The platform entity 300 seals the first piece of protected secret data in the TEE 340 of the platform entity 300.

In some aspects the at least one nonce is sealed. In particular, according to an embodiment the platform entity 300 is configured to perform (optional) step S212:

S212: The platform entity 300 seals the at least one nonce in the TEE 340 of the platform entity 300.

Further, the secret data and nonce might be bound to the platform entity 300 by being bound to specific platform configuration register (PCR) values. Hence, according to an embodiment, the first piece of protected secret data and the at least one nonce is sealed in the TEE 340 of the platform entity 300 by being bound to respective PCR values in the TEE 340 of the platform entity 300.

In accordance with the above, in some aspects the trust level might be increased by more data being sent to the platform entity 300. Hence, according to an embodiment the platform entity 300 is configured to perform (optional) steps S216 and S218:

S216: The platform entity 300 receives, from the TEE 240 of the verification entity 200, a second piece of protected secret data.

S218: The platform entity 300 sends, towards the TEE 240 of the verification entity 200, a protected concatenation of both pieces of the secret data and the at least one nonce. These both pieces of secret data and the at least one nonce are concatenated and protected in the TEE 340 of the platform entity 300 before being sent to the verification entity 200.

In accordance with the above, in some aspects the first piece of data is concatenated with an identifier of the first piece of data before being protected and sent to the platform entity 300. Thus, according to an embodiment, the first piece of data is concatenated with an identifier of the first piece of data before being protected and sent to the platform entity 300. The at least one nonce is then concatenated with this identifier before being protected and sent to the platform entity 300.

In accordance with the above, in some aspects the trust level might be increased by using message authentication codes. Thus, according to an embodiment, the first piece of protected secret data is accompanied by a message authentication code of the first piece of protected secret data. The message authentication code is then verified in the TEE 340 of the platform entity 300 before the protected concatenation of the secret data and the at least one nonce is sent towards the TEE 240 of the verification entity 200.

In accordance with the above, in some aspects the trust level might be increased by using message authentication codes. Thus, according to an embodiment, the concatenation of the secret data and the at least one nonce is provided as a digest of the concatenation of the secret data and the at least one nonce.

Further aspects of protecting the secret data will now be disclosed.

The platform entity 300 might seal the secret data received from the verifier entity 300 to ensure its confidentiality. The thus sealed secret data might be bound to the integrity of the platform entity 300. As an example, this means that if the platform entity 300 becomes corrupted as a result of an offline or online attack, the platform entity 300 will no longer be able to access any sealed secret data.

In general terms, seal/unseal operations in the context of TEEs implies that when data is sealed (such as being encrypted) by being bound to specific PCR value(s) of the TEE, the thus sealed and bound data can only be unsealed if the PCR value(s) are the same. Otherwise the TEE will refuse to unseal the data. As an example, if the PCR value(s) hold digests values of the kernel of the platform entity 300 and/or the platform entity 300 itself, once the kernel and/or the platform entity 300 becomes corrupt, the data is no longer made accessible as measurement values change and the unseal operation therefore cannot succeed. While this might be a desired behavior, it also brings its own challenges, especially with software and firmware updates at the platform entity 300 that will result in the platform entity 300 having different PCR values. If this update process and seal/unseal operations are not handled properly, this can result in loss of the sealed data. This means that while handling software and firmware updates that might affect PCR values (and thus the unseal operation), a mechanism might be in place to handle this transition securely and properly. One example is to use so-called "trusted keys" that allow updates of PCR values by resealing the data based on known PCR value(s) in advance. Another example is to unseal the data before software or firmware updates (that affect PCR value(s)) and to reseal the data after measurements are populated into the PCR(s). During the transition phase, the data needs to be properly protected. The seal operation might be performed using TEE specific keys. As an example, if the security version of the TEE changes, this might result in having different TEE specific keys and thus the unseal operation will fail if the TEE specific key is derived based the security version. This also requires a mechanism that handles the unsealing and resealing operations successfully.

Figure 4:
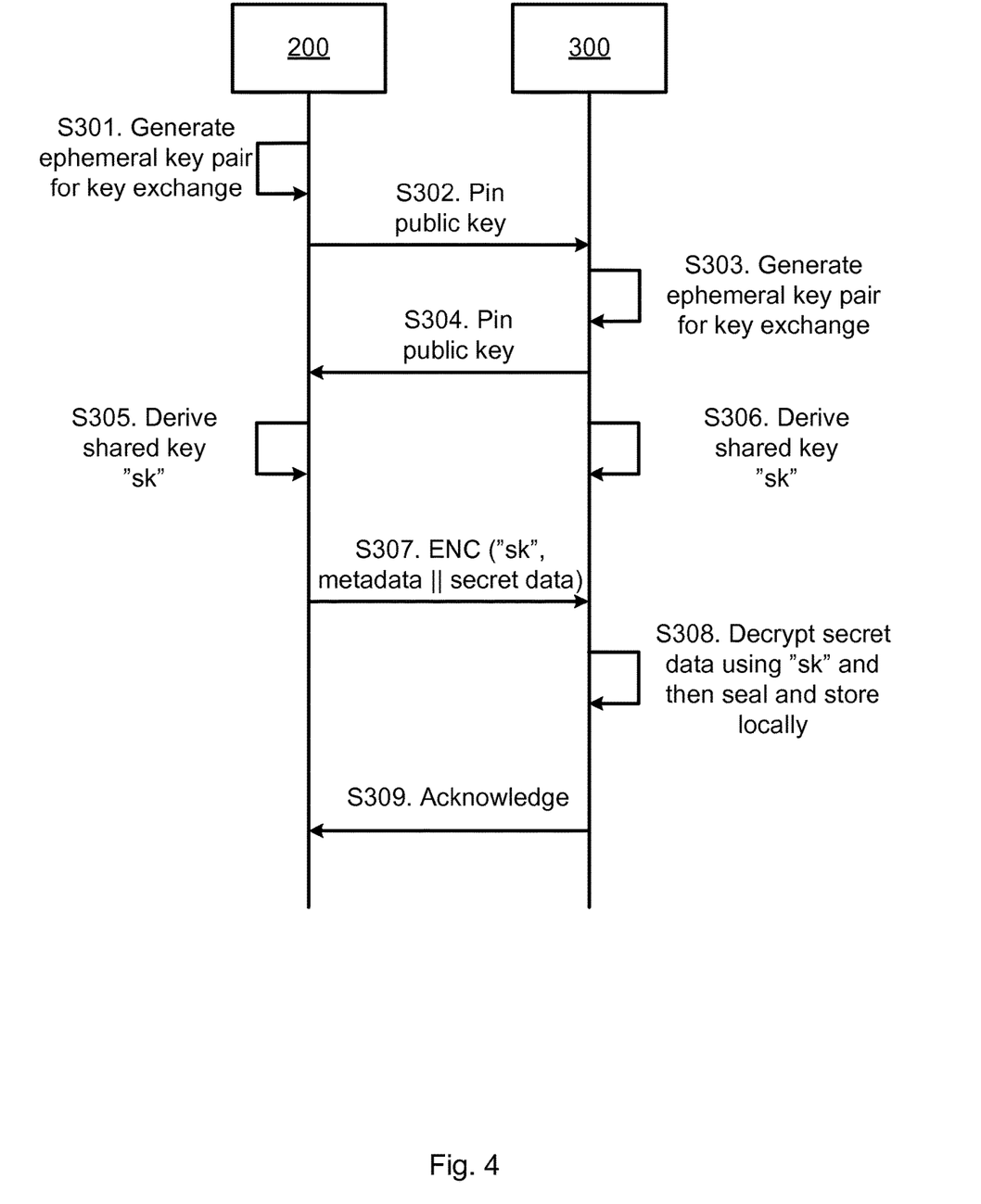
FIGS. 4, 5, and 6 are signalling diagrams according to embodiments.

One particular embodiment for mutual authentication and transmission of secret data from the verifier entity 200 to the platform entity 300 based on at least some of the above disclosed embodiments will now be disclosed in detail with reference to the signalling diagram of FIG. 4.

S301: The verifier entity 200 generates an ephemeral key pair for key exchange with the platform entity 300 as disclosed above.

S302: The verifier entity 200 provides the public key of its generated key pair to the platform entity 300 by pinning the public key to the platform entity 300.

S303: The platform entity 300 generates an ephemeral key pair for key exchange with the verifier entity 200 as disclosed above, S304: The platform entity 300 provides the public key of its generated key pair to the verifier entity 200 by pinning the public key to the verifier entity 200.

S305: The verifier entity 200 derives the shared key "sk" as disclosed above.

S306: The platform entity 300 derives the shared key "sk" as disclosed above S307: The verifier entity 200 concatenates metadata (for example in the form of an identifier) and secret data. The concatenated metadata and secret data is encrypted using the key "sk". The thus encrypted and concatenated metadata and secret data (ENC ("sk", metadata∥secret data)) is sent to the platform entity 300.

S308: The platform entity 300 uses the key "sk" to decrypt the encrypted concatenated metadata and secret data. The metadata and secret data are sealed and stored in the TEE 340 of the platform entity 300.

S309: The platform entity 300 acknowledges safe receipt of the metadata and secret data to the verifier entity 200.

Figure 5:
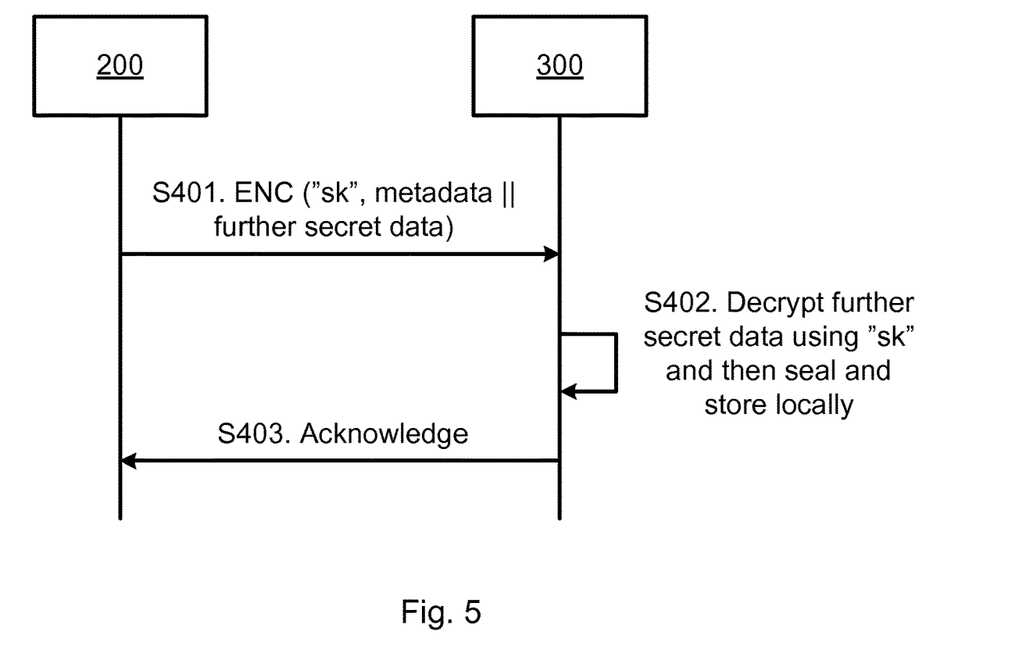

One particular embodiment for transmission of further secret data from the verifier entity 200 to the platform entity 300 based on at least some of the above disclosed embodiments will now be disclosed in detail with reference to the signalling diagram of FIG. 5.

S401: The verifier entity 200 concatenates metadata (for example in the form of an identifier) and further secret data. The concatenated metadata and further secret data is encrypted using the key "sk". The thus encrypted and concatenated metadata and further secret data (ENC ("sk", metadata∥further secret data)) is sent to the platform entity 300.

S402: The platform entity 300 uses the key "sk" to decrypt the encrypted concatenated metadata and further secret data. The metadata and further secret data are sealed and stored in the TEE 340 of the platform entity 300.

S403: The platform entity 300 acknowledges safe receipt of the metadata and further secret data to the verifier entity 200.

Figure 6:
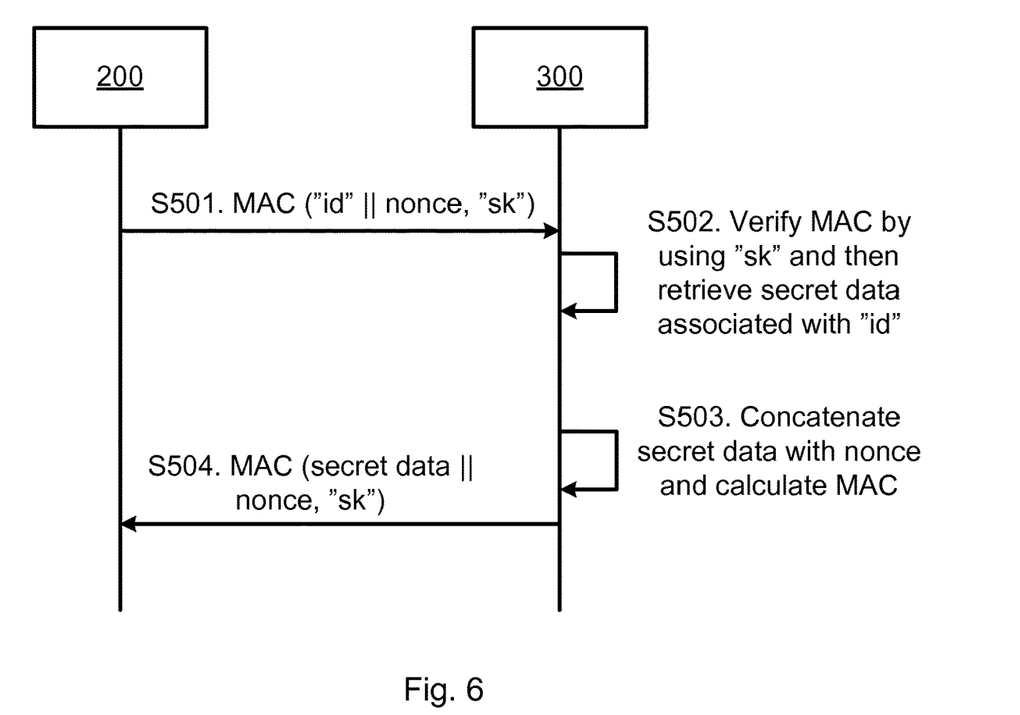

One particular embodiment for sending a nonce from the verifier entity 200 to the platform entity 300 based on at least some of the above disclosed embodiments will now be disclosed in detail with reference to the signalling diagram of FIG. 6.

S501: The verifier entity 200 uses the key "sk" to determine a message authentication code of a concatenation of an identifier "id" and a nonce. The identifier "id" identifies secret data as sent to the platform entity in one of steps S307 and S401 (as well as steps S104 and S114).

S502: The platform entity 300 verifies the message authentication code by using the key "sk". The platform entity 300 retrieves the secret data associated with the identifier "id".

S503: The platform entity 300 uses the key "sk" to determine a message authentication code of a concatenation of the retrieved secret data and the nonce.

S504: The platform entity 300 sends the message authentication code to the verifier entity 200.

In summary, according to at least some of the embodiments disclosed herein there has been proposes mechanism to reduce the complexity of obtaining platform integrity assurance. The assurance is obtained by protected secret data and at least one nonce being shared between the verifier entity 200 and the platform entity. If, anytime during the runtime of the platform entity 300, the platform entity 300 is maliciously modified, then the thus corrupted platform entity 300 will not be able to know that secret data and nonce hence would fail the attestation as performed by the verifier entity 200.

Figure 7:
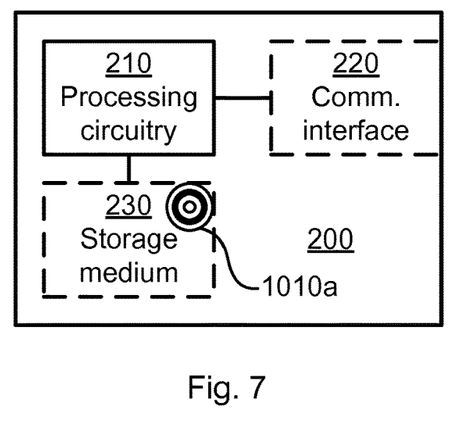
FIG. 7 is a schematic diagram showing functional units of a verification entity according to an embodiment.

FIG. 7 schematically illustrates, in terms of a number of functional units, the components of a verification entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the verification entity 200 to perform a set of operations, or steps, as disclosed above. For example, the storage medium 230 may store the set of operations, and the processing circuitry 210 may be configured to retrieve the set of operations from the storage medium 230 to cause the verification entity 200 to perform the set of operations. The set of operations may be provided as a set of executable instructions. Thus the processing circuitry 210 is thereby arranged to execute methods as herein disclosed. The processing circuitry 210 might comprise a secure area that holds the TEE 240.

The storage medium 230 may also comprise persistent storage, which, for example, can be any single one or combination of magnetic memory, optical memory, solid state memory or even remotely mounted memory. The storage medium 230 may hold the internal storage 250.

The verification entity 200 may further comprise a communications interface 220 for communications with other entities, functions, nodes, and devices, such as the platform entity 300. As such the communications interface 220 may comprise one or more transmitters and receivers, comprising analogue and digital components.

The processing circuitry 210 controls the general operation of the verification entity 200 e.g. by sending data and control signals to the communications interface 220 and the storage medium 230, by receiving data and reports from the communications interface 220, and by retrieving data and instructions from the storage medium 230. Other components, as well as the related functionality, of the verification entity 200 are omitted in order not to obscure the concepts presented herein.

Figure 8:
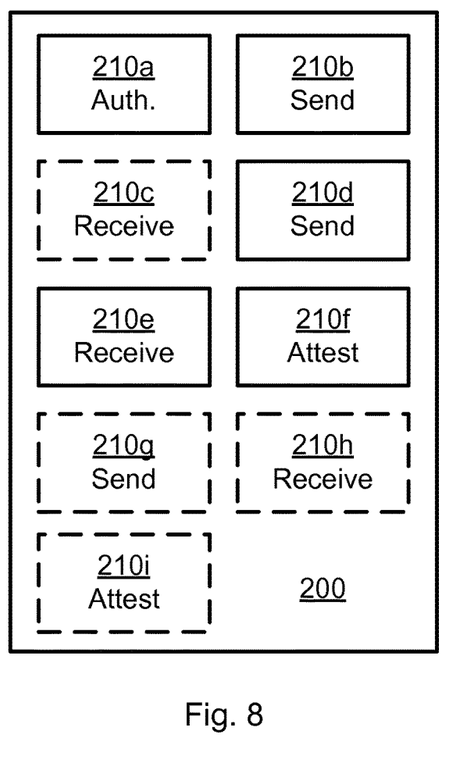
FIG. 8 is a schematic diagram showing functional modules of a verification entity according to an embodiment.

FIG. 8 schematically illustrates, in terms of a number of functional modules, the components of a verification entity 200 according to an embodiment. The verification entity 200 of FIG. 8 comprises a number of functional modules; an authentication module 210a configured to perform step S102, a send module 210b configured to perform step S104, a send module 210d configured to perform step S108, a receive module 210e configured to perform step S110, and an attest module 210f configured to perform step S112. The verification entity 200 of FIG. 8 may further comprise a number of optional functional modules, such as any of a receive module 210c configured to perform step S106, a send module 210g configured to perform step S114, a receive module 210h configured to perform step S116, and an attest module 210i configured to perform step S118.

In general terms, each functional module 210a-210i may be implemented in hardware or in software. Preferably, one or more or all functional modules 210a-210i may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210i and to execute these instructions, thereby performing any steps of the verification entity 200 as disclosed herein.

Figure 9:
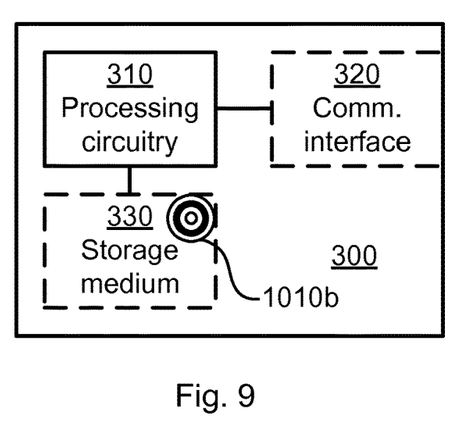
FIG. 9 is a schematic diagram showing functional units of a platform entity according to an embodiment.

FIG. 9 schematically illustrates, in terms of a number of functional units, the components of a platform entity 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the platform entity 300 to perform a set of operations, or steps, as disclosed above. For example, the storage medium 330 may store the set of operations, and the processing circuitry 310 may be configured to retrieve the set of operations from the storage medium 330 to cause the platform entity 300 to perform the set of operations. The set of operations may be provided as a set of executable instructions. Thus the processing circuitry 310 is thereby arranged to execute methods as herein disclosed. The processing circuitry 310 might comprise a secure area that holds the TEE 340.

The storage medium 330 may also comprise persistent storage, which, for example, can be any single one or combination of magnetic memory, optical memory, solid state memory or even remotely mounted memory. The storage medium 330 may hold the internal storage 350.

The platform entity 300 may further comprise a communications interface 320 for communications with other entities, functions, nodes, and devices, such as the verification entity 200. As such the communications interface 320 may comprise one or more transmitters and receivers, comprising analogue and digital components.

The processing circuitry 310 controls the general operation of the platform entity 300 e.g. by sending data and control signals to the communications interface 320 and the storage medium 330, by receiving data and reports from the communications interface 320, and by retrieving data and instructions from the storage medium 330. Other components, as well as the related functionality, of the platform entity 300 are omitted in order not to obscure the concepts presented herein.

Figure 10:
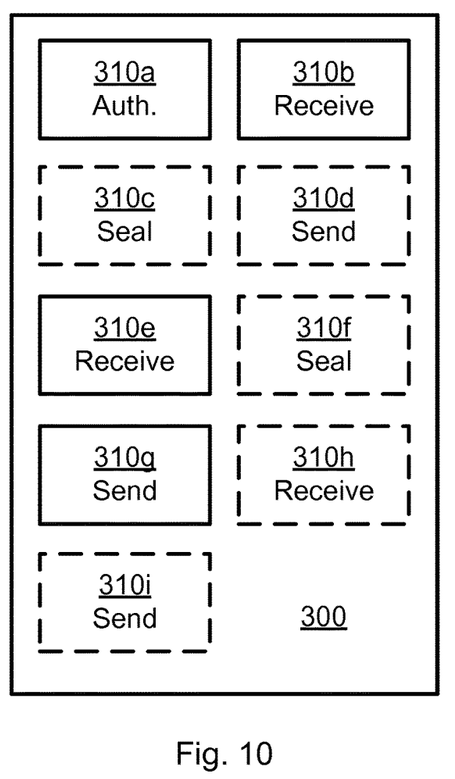
FIG. 10 is a schematic diagram showing functional modules of a platform entity according to an embodiment.

FIG. 10 schematically illustrates, in terms of a number of functional modules, the components of a platform entity 300 according to an embodiment. The platform entity 300 of FIG. 10 comprises a number of functional modules; an authentication module 310a configured to perform step S202, a receive module 310b configured to perform step S204, a receive module 310e configured to perform step S210, and a send module 310g configured to perform step S114. The platform entity 300 of FIG. 10 may further comprise a number of optional functional modules, such as any of a seal module 310c configured to perform step S206, a send module 310d configured to perform step S208, a seal module 310f configured to perform step S212, a receive module 310h configured to perform step S216, and a send module 310i configured to perform step S218.

In general terms, each functional module 310a-310i may be implemented in hardware or in software. Preferably, one or more or all functional modules 310a-310i may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310i and to execute these instructions, thereby performing any steps of the platform entity 300 as disclosed herein.

Each of the verification entity 200 and/or platform entity 300 may be provided as a standalone device or as a part of at least one further device. For example, a first portion of the instructions performed by the verification entity 200 and/or platform entity 300 may be executed in a respective first device, and a second portion of the instructions performed by the verification entity 200 and/or platform entity 300 may be executed in a respective second device; the herein disclosed embodiments are not limited to any particular number of devices on which the instructions performed by the verification entity 200 and/or platform entity 300 may be executed. Hence, the methods according to the herein disclosed embodiments are suitable to be performed by a verification entity 200 and/or platform entity 300 residing in a cloud computational environment. Therefore, although a single processing circuitry 210, 310 is illustrated in FIGS. 7 and 9 the processing circuitry 210, 310 may be distributed among a plurality of devices, or nodes. The same applies to the functional modules 210a-210i, 310a-310i of FIGS. 8 and 10 and the computer programs 1120a, 1120b of FIG. 11.

Figure 11:
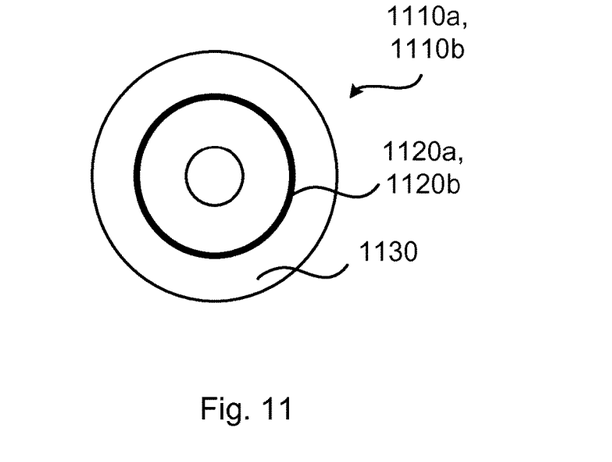
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the verification entity 200 as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the platform entity 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for enabling attestation of a platform entity by a verification entity, the method being performed by the platform entity, the method comprising:
performing mutual authentication between a trusted execution environment, TEE, of the platform entity and a TEE of the verification entity;
receiving, from the TEE of the verification entity, a first piece of protected secret data;
receiving, from the TEE of the verification entity, at least one protected nonce;
sealing the at least one nonce in the TEE of the platform entity;
sealing the first piece of protected secret data in the TEE of the platform entity, the first piece of protected secret data and the at least one nonce being sealed in the TEE of the platform entity by being bound to respective platform configuration register values in the TEE of the platform entity; and
sending, towards the TEE of the verification entity, a protected concatenation of the secret data and the at least one nonce, the secret data and the at least one nonce having been concatenated and protected in the TEE of the platform entity.

2. The method according to claim 1, wherein, as part of performing the mutual authentication, the platform entity generates and exchanges a key with the verification entity for protecting the concatenation of the secret data and the at least one nonce when sent towards the TEE of the verification entity.

3. The method according to claim 2, wherein the key is sealed at the TEE of the platform entity.

4. The method according to claim 1, wherein the mutual authentication is performed as part of a bootstrapping process of the platform entity.

5. The method according to claim 1, wherein each of the at least one nonce is received during runtime of the platform entity.

6. The method according to claim 1, further comprising:
sending, towards the TEE of the verification entity, acknowledgement of receipt of the first piece of protected secret data.

7. The method according to claim 1, further comprising:
receiving, from the TEE of the verification entity, a second piece of protected secret data; and
sending, towards the TEE of the verification entity, a protected concatenation of both pieces of the secret data and the at least one nonce, said both pieces of secret data and the at least one nonce having been concatenated and protected in the TEE of the platform entity.

8. The method according to claim 1, wherein the first piece of data is concatenated with an identifier of the first piece of data before being protected and sent to the platform entity, and wherein the at least one nonce is concatenated with said identifier before being protected and sent to the platform entity.

9. The method according to claim 1, wherein the first piece of protected secret data is accompanied by a message authentication code of the first piece of protected secret data, and wherein the message authentication code is verified in the TEE of the platform entity before the protected concatenation of the secret data and the at least one nonce is sent towards the TEE of the verification entity.

10. The method according to claim 1, wherein the concatenation of the secret data and the at least one nonce is provided as a digest of the concatenation of the secret data and the at least one nonce.

11. The method according to claim 1, wherein the TEE of the platform entity is an enclave instance.

12. A platform entity for enabling attestation of the platform entity by a verification entity, the platform entity comprising processing circuitry, the processing circuitry being configured to cause the platform entity to:
perform mutual authentication between a trusted execution environment, TEE, of the platform entity and a TEE of the verification entity;
receive, from the TEE of the verification entity, a first piece of protected secret data;
receive, from the TEE of the verification entity, at least one protected nonce;
seal the at least one nonce in the TEE of the platform entity;
seal the first piece of protected secret data in the TEE of the platform entity, the first piece of protected secret data and the at least one nonce being sealed in the TEE of the platform entity by being bound to respective platform configuration register values in the TEE of the platform entity; and send, towards the TEE of the verification entity, a protected concatenation of the secret data and the at least one nonce, the secret data and the at least one nonce having been concatenated and protected in the TEE of the platform entity.

13. The platform entity of claim 12, further being configured to generate and exchange a key with the verification entity for protecting the concatenation of the secret data and the at least one nonce when sent towards the TEE of the verification entity.

14. The platform entity of claim 12 wherein the key is sealed at the TEE of the platform entity.

15. The platform entity of claim 12, wherein the mutual authentication is performed as part of a bootstrapping process of the platform entity.

16. The platform entity of claim 12, wherein each of the at least one nonce is received during runtime of the platform entity.

17. The platform entity of claim 12, further configured to send, towards the TEE of the verification entity, acknowledgement of receipt of the first piece of protected secret data.

* * * * *